United States Patent [19]
Moore

[11] 3,785,616
[45] Jan. 15, 1974

[54] METERING VALVE

[75] Inventor: Coleman B. Moore, East Nantmeal Township, Chester County, Pa.

[73] Assignee: Moore Products Co., Spring House, Pa.

[22] Filed: July 15, 1971

[21] Appl. No.: 162,763

[52] U.S. Cl. ................................ 251/121, 138/43
[51] Int. Cl. ....................... F16k 47/06, F15d 1/10
[58] Field of Search................... 251/126, 121, 209; 138/43

[56] References Cited
UNITED STATES PATENTS

| | | | |
|---|---|---|---|
| 2,324,360 | 7/1943 | Camerota | 138/43 |
| 2,323,115 | 6/1943 | Bryant | 138/43 |
| 1,754,138 | 4/1930 | Agee | 251/121 |
| 1,918,959 | 7/1933 | Culp | 138/43 |
| 3,176,713 | 4/1965 | McDermott et al. | 251/368 |
| 2,683,973 | 7/1954 | Mettler | 138/43 X |
| 2,568,123 | 9/1951 | Goldberg | 138/43 |

Primary Examiner—Arnold Rosenthal
Attorney—Zachary T. Wobensmith, 2nd

[57] ABSTRACT

A metering valve for precision flow control of fluids is shown having a body with a valve stem in threaded engagement in a valve holding member in the body for advancing and retracting movement to adjust the position of the stem. The body has a bushing or sleeve, preferably of resilient synthetic plastic material interposed between inlet and outlet fluid connections and exposed to the upstream pressure and a portion of the valve stem extends into the sleeve which portion is provided with a tapered helical thread or groove for fluid flow. The pitch of the threads on the threaded portion and the pitch of the tapered helical groove can be the same or slightly different. Provision is made for shut off of flow. The sleeve is preferably of a composition having a reduced coefficient of thermal expansion normal to its axis for use at elevated temperatures.

4 Claims, 4 Drawing Figures

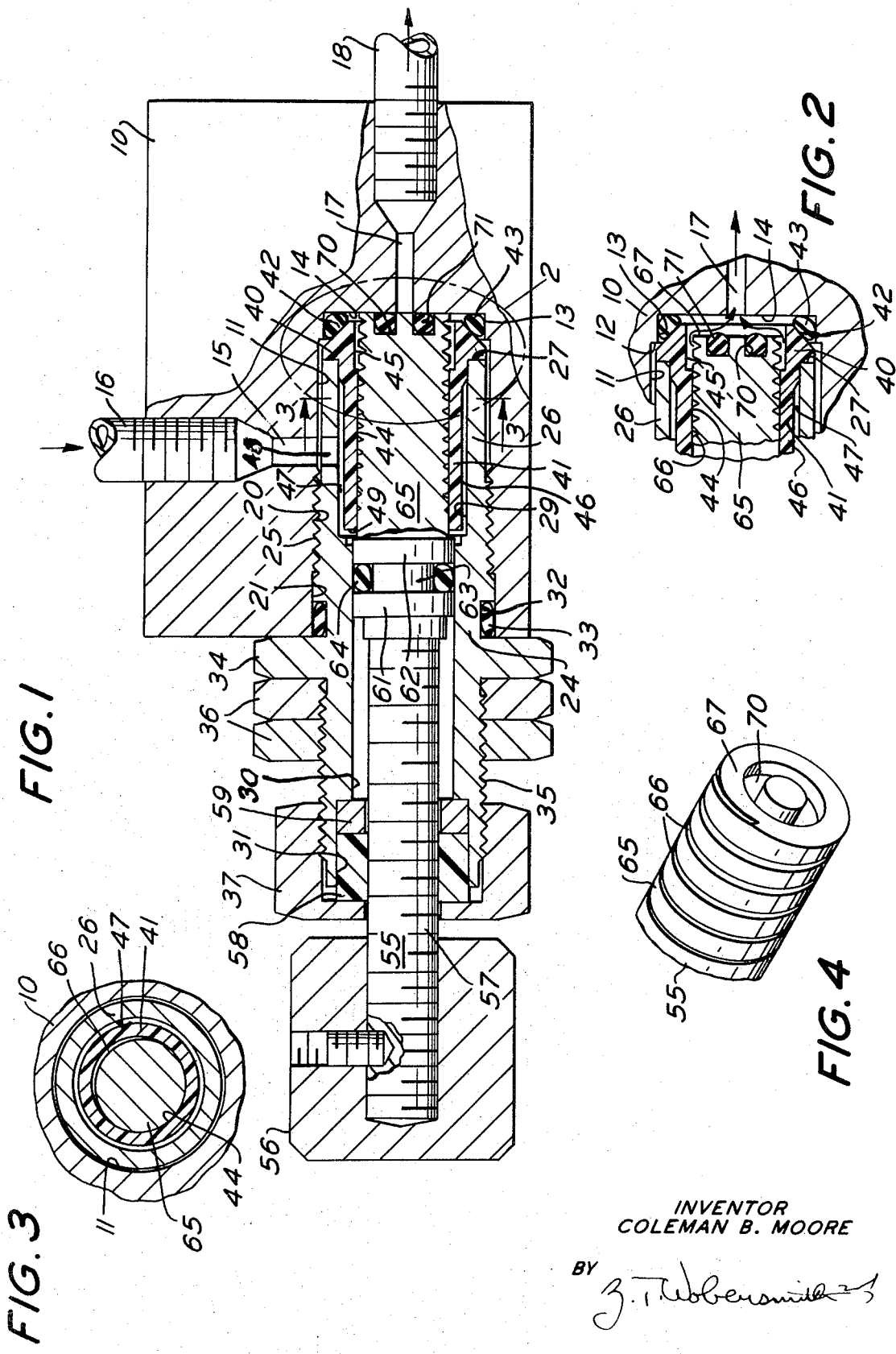

METERING VALVE

BACKGROUND OF THE INVENTION

1. Field of the Invention

This invention relates to metering valves and more particularly to valves for use with small flows of high pressure fluid with a wide range of adjustment.

2. Description of the Prior Art

It has heretofore been the common practice to employ needle valves for the control of small flows but these are difficult to accurately adjust for close control of small flows and may clog with very small flows.

It has also heretofore been proposed to control the flow of fluid with a valve having a threaded valve stem for positioning of a head having an integral internal cylindrical surface movable with respect to a portion of the valve body which has thereon a helical groove of uniform cross section to vary the length of the helical path through which fluid flows. The structure requires high precision in the manufacture of the mating parts and did not permit shut-off.

SUMMARY OF THE INVENTION

In accordance with the invention a metering valve is provided with which flow can be shut-off and with which control of small flows of high pressure fluids is effected. The control of rate of flow is effected by movement of a valve stem having a threaded portion for determining the positioning of the valve stem with respect to a sleeve of synthetic plastic material with an interference fit and preferably having a reduced coefficient of thermal expansion for operation at elevated temperatures. Provision is also made to eliminate end play or backlash in the valve adjustment.

It is the principal object of the present invention to provide a metering valve which is simple in construction, which has a wide range of flow adjustment and which avoids cyclical variation in its adjustment.

It is a further object of the present invention to provide a metering valve which does not require precision manufacture of the parts movably engaged for flow control.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a longitudinal sectional view, enlarged, of a metering valve in accordance with the invention in shut-off condition;

FIG. 2 is a fragmentary view of a portion of the valve with the stem in operating position for flow at a set level;

FIG. 3 is a transverse sectional view taken approximately in the line 3—3 of FIG. 1; and FIG. 4 is a view in perspective of one end of the valve stem.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, a valve body 10 is provided in the form of a block having a cylindrical interior bore 11 with a shoulder 12 qnd reduced end portion 13 with a terminal wall 14.

A fluid supply passageway 15, communicating with the bore 11, may have a fluid supply pipe 16 connected thereto, and a fluid delivery passageway 17 terminating at the end wall 14 may have a fluid delivery pipe 18 connected thereto.

The bore 11 has axially aligned therewith a threaded portion 20 with an enlarged cylindrical bore 21 outwardly thereof.

A valve stem carrier 24 is provided, preferably of metal, having a threaded portion 25 for engagement with the threaded portion 20 of the valve body 10 and a hollow cylindrical extension 26 with an end face 27, and an interior bore 29 from which an aligned interior bore 30 extends outwardly to an enlarged packing bore 31.

The valve stem carrier 24, outwardly of the threaded portion 25, has a groove 32 for the reception of a packing ring 33 and a hexagonal portion 34 for positioning of the carrier 24.

The valve stem carrier 24, beyond the hexagonal portion 34, has a threaded section 35 on which panel mounting nuts 36 are carried and on which a gland nut 37 is engaged.

The valve stem carrier 24 has its end face 27 in engagement with a rim 40 of a metering sleeve 41. The rim 40 of the metering sleeve 41 has a tapered end face 42 which engages a packing ring 43, such as an O-ring, in the bore end portion 13 and holds the packing ring 43 engaged with the bore end portion 13 and end wall 14 to prevent fluid leakage at this location.

The metering sleeve 41 has an inner bore 44, an enlarged end bore portion 45, and an exterior surface 46 of reduced diameter to provide a surrounding space 47 which communicates with the fluid suply passageway 48 in the extension 26 of the carrier 24.

The metering sleeve 41 has an opposite end face 49 which terminates in spaced relation from the bore 30, to permit fluid flow.

The metering sleeve 41 is preferably made of resilient synthetic plastic material such as teflon, which may be modified if desired by the addition of a filler, such as glass fibers, mica, ceramic materials or polymeric materials, which substantially reduces the coefficient of thermal expansion radially. Thus the differential thermal expansion between the sleeve 41 and the stem portion 65 will be minimized to permit operation at elevated temperatures.

A valve stem 55 is provided, preferably of metal, which may have a knob 56 on its outer end for manual turning thereof.

The valve stem 55 extends through the gland nut 37 and has a threaded stem portion 57 which is engaged with an internally threaded nut 58 of resilient synthetic plastic material which is held by the gland nut 37 against a gland packing 59 in the packing bore 31.

The use of a resilient nut 58 affected by adjustment of the gland nut 37 avoids lost motion or backlash upon movement of the valve stem 55.

The valve stem 55 has spaced shoulders 61 and 62 with a groove 63 therebetween for the reception of a packing ring 64, such as an O-ring, which engages the bore 30 to prevent fluid leakage at this location.

The valve stem 55 has a stem portion 65 extending within the bore 44 of the metering sleeve 41.

The stem portion 65 is provided on the exterior thereof with a helical groove 66 which commences at its end face 67 and extends toward the shoulder 62. The groove 66 is of decreasing cross section and terminated before it reaches the shoulder 62. The pitch of the groove 66 can be the same as the pitch of the threads of the threaded portion 57 to avoid cyclical variations upon valve adjustment and also to minimize the abrasion of the sleeve 41 by the stem portion 65.

The stem portion 65 preferably has an interference fit with respect to the bore 44 to provide a leak-tight fit without the necessity for extreme precision in the manufacture of these parts.

The end face 67 of the valve stem portion 65 has a groove 70 for the reception of a packing ring 71, such as an O-ring, to engage the terminal wall 14 and cut off fluid flow when positioned as shown in FIG. 1 but to permit fluid flow when positioned as shown in FIG. 2.

The mode of operation will now be pointed out.

The valve is shown in shut off position in FIG. 1, the packing 71 in the groove 70 being in engagement with the terminal wall 14 and preventing any flow of fluid to the fluid delivery passageway 17.

Fluid under pressure in the fluid supply pipe 16 and fluid supply passageway 15 is effective through the passageway 48 and to the space 47 where it tends to compress the resilient metering sleeve 41 against the metallic valve stem portion 65. It has been found that by exposing the outside of the resilient metering sleeve 41 to the upstream pressure the valve will withstand much higher pressure differential than it will for flow in the opposite direction.

If, now, the valve stem 55 is turned by the knob 56 the packing ring 71 will be separated from its seat on the terminal wall 14 (see FIG. 2) and can be turned to the desired extent to permit fluid flow from the space 47 around the end face 49 of the metering sleeve 41 and along the groove 66. The flow will be determined by the exposure of a smaller or larger cross section of the groove 66 at the upstream end in accordance with the positioning of the valve stem portion 65 in the metering sleeve 41.

I claim:

1. A metering valve comprising a body having an interior opening with fluid supply and delivery passageways communicating therewith, a metering member in said opening having a longitudinal bore, a valve stem having a portion extending into said bore, said metering member being of resilient synthetic plastic material and having a sleeve portion on the exterior surface of which pressure in said fluid supply passageway is effective for compressing said sleeve portion into engagement with said valve stem portion, said valve stem portion having a helical groove thereon for controlling flow therein as determined by the positioning of said stem portion along said metering member, said grooved valve stem portion and said metering member having an interference fit.

2. A metering valve as defined in claim 1 in which said helical groove is of diminishing cross section between its ends.

3. A metering valve as defined in claim 1 in which said valve stem and said body have interengageable portions for shutting off fluid flow between said supply and said delivery connections.

4. A metering valve comprising a body having an interior opening wtth fluid supply and delivery passageways communicating therewith, a metering member in said opening having a longitudinal bore, a valve stem having a portion extending into said bore, said stem portion having a helical groove thereon of diminishing cross section between its ends for controlling flow therein as determined by the positioning of said stem portion along said metering member, said body having mounted thereon a valve stem carrier, said threaded member comprising an internally threaded nut with which said threaded portion of said stem is in engagement, and said nut being of resilient plastic material for eliminating backlash.

* * * * *